United States Patent
Chen

(10) Patent No.: US 8,371,711 B2
(45) Date of Patent: Feb. 12, 2013

(54) LIGHTING DEVICE WITH WIND GENERATOR

(76) Inventor: Kuo-Chen Chen, Chiayi (TW)

( * ) Notice: Subject to any disclaimer, the term of this patent is extended or adjusted under 35 U.S.C. 154(b) by 131 days.

(21) Appl. No.: 13/110,645

(22) Filed: May 18, 2011

(65) Prior Publication Data

US 2011/0299273 A1    Dec. 8, 2011

(30) Foreign Application Priority Data

Jun. 4, 2010   (TW) ............................... 99210678 U

(51) Int. Cl.
F21V 33/00    (2006.01)

(52) U.S. Cl. .................... 362/192; 362/183; 362/473

(58) Field of Classification Search .......... 362/473–476, 362/183, 192, 193, 96
See application file for complete search history.

(56) References Cited

U.S. PATENT DOCUMENTS

| | | | |
|---|---|---|---|
| 6,398,381 B1 * | 6/2002 | Tseng | 362/96 |
| 6,588,913 B1 * | 7/2003 | Huang | 362/96 |
| 6,923,552 B2 * | 8/2005 | Tseng | 362/192 |
| 7,309,141 B2 * | 12/2007 | Scott et al. | 362/192 |
| 2006/0092621 A1 * | 5/2006 | Lai | 362/96 |
| 2007/0097668 A1 * | 5/2007 | Choi | 362/105 |
| 2008/0022920 A1 * | 1/2008 | Custodis | 116/202 |
| 2009/0244890 A1 * | 10/2009 | Pelken et al. | 362/192 |
| 2009/0262524 A1 * | 10/2009 | Chen | 362/192 |
| 2009/0262525 A1 * | 10/2009 | Lai | 362/192 |

* cited by examiner

Primary Examiner — Laura Tso
(74) Attorney, Agent, or Firm — Banner & Witcoff, Ltd.

(57) ABSTRACT

A lighting device includes a casing unit, a lighting module, a wind generator, a power port module, a battery seat and a control module. The casing unit includes a first side, a second side, and a wind duct extending through the first and second sides. The lighting module is disposed at the first side and operable to emit light outwardly of the casing unit and away from the first side of the casing unit. The wind generator includes a blade unit disposed in the wind duct, and an electric generator unit coupled to the blade unit. The blade unit is driven to rotate by wind flow. The electric generator unit is driven by rotation of the blade unit to generate electricity. The control module is configured to control distribution of electricity generated by the electric generator unit to the lighting module, the power port module and the battery seat.

8 Claims, 4 Drawing Sheets

LIGHTING DEVICE WITH WIND GENERATOR

CROSS-REFERENCE TO RELATED APPLICATION

This application claims priority of Taiwanese Application No. 099210678, filed on Jun. 4, 2010.

BACKGROUND OF THE INVENTION

1. Field of the Invention

The present invention relates to a lighting device, more particularly to a lighting device with a wind generator and suitable for mounting on a vehicle.

2. Description of the Related Art

A conventional lighting device with a wind generator for vehicle use is disclosed in Taiwanese Patent No. M307718. The lighting device includes a casing which is provided with a light guide member. The casing of the lighting device includes a left side, a right side opposite to the left side, and an upper side disposed between the left side and the right side of the casing. The light guide member is disposed around the casing and extends from the left side through the upper side to the right side. The light guide member guides light beams emitted from a light-emitting diode (LED) unit disposed in the casing so as to distribute the light beams to surroundings of the light guide member. Therefore, the lighting device may achieve an effect of warning other vehicles coming from the left side or the right side.

However, the light guide member of the aforesaid conventional lighting device is incapable of providing forwardly directed illumination and front warning light. Furthermore, the aforesaid conventional lighting device is incapable of providing electricity generated by the wind generator for external electronic devices. Moreover, when electricity stored in an electricity storage unit of the conventional lighting device is insufficient and wind flow through the wind generator is not strong enough for generating adequate electricity to charge the electricity storage unit, there is no other means to charge the electricity storage unit.

Moreover, a portable charger is disclosed in Taiwanese Publication No. 200845533. The portable charger includes a rechargeable battery module, a fluid energy converting device for converting kinetic energy of fluids flowing therethrough into electric power to charge the rechargeable battery module, a control circuit coupled to the rechargeable battery module, and a power output interface coupled to the control circuit for supplying power to an electronic device under the control of the control circuit when the power output interface is electrically connected to the electronic device.

SUMMARY OF THE INVENTION

Therefore, an object of the present invention is to provide a lighting device with a wind generator and capable of overcoming the aforementioned drawbacks of the prior art.

Accordingly, the lighting device of the present invention includes a casing unit, a lighting module, a wind generator, a power port module, a battery seat, and a control module.

The casing unit includes a first side, a second side opposite to the first side, and a wind duct that extends through the first side and the second side.

The lighting module is disposed at the first side of the casing unit, and is operable to emit light outwardly of the casing unit and away from the first side of the casing unit.

The wind generator includes a blade unit disposed in the wind duct and an electric generator unit coupled to the blade unit. The blade unit is driven to rotate by wind flow through the wind duct. The electric generator unit is driven by rotation of the blade unit to generate electricity.

The power port module is mounted to the casing unit, is accessible from an exterior of the casing unit, and is adapted for connecting to an external electronic device.

The battery seat is mounted to the casing unit, and is adapted for connecting electrically to a battery unit.

The control module is electrically coupled to the lighting module, the electric generator unit, the power port module and the battery unit, and is configured to control distribution of electricity generated by the electric generator unit to the lighting module, the power port module, and the battery seat for charging the battery unit that is connected to the battery seat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
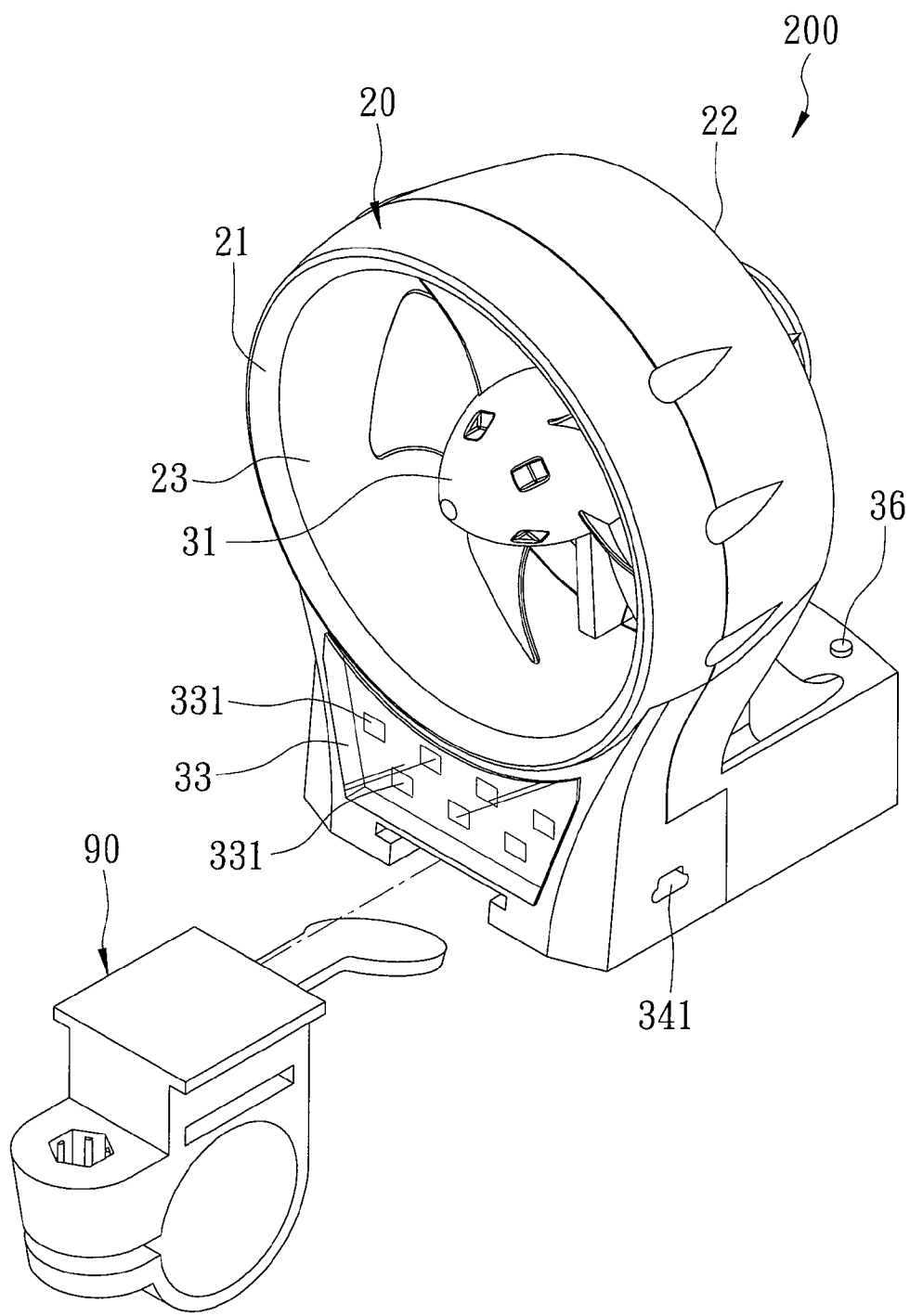
FIG. 1 is a perspective view of a preferred embodiment of a lighting device with a wind generator of the present invention.
Figure 2:
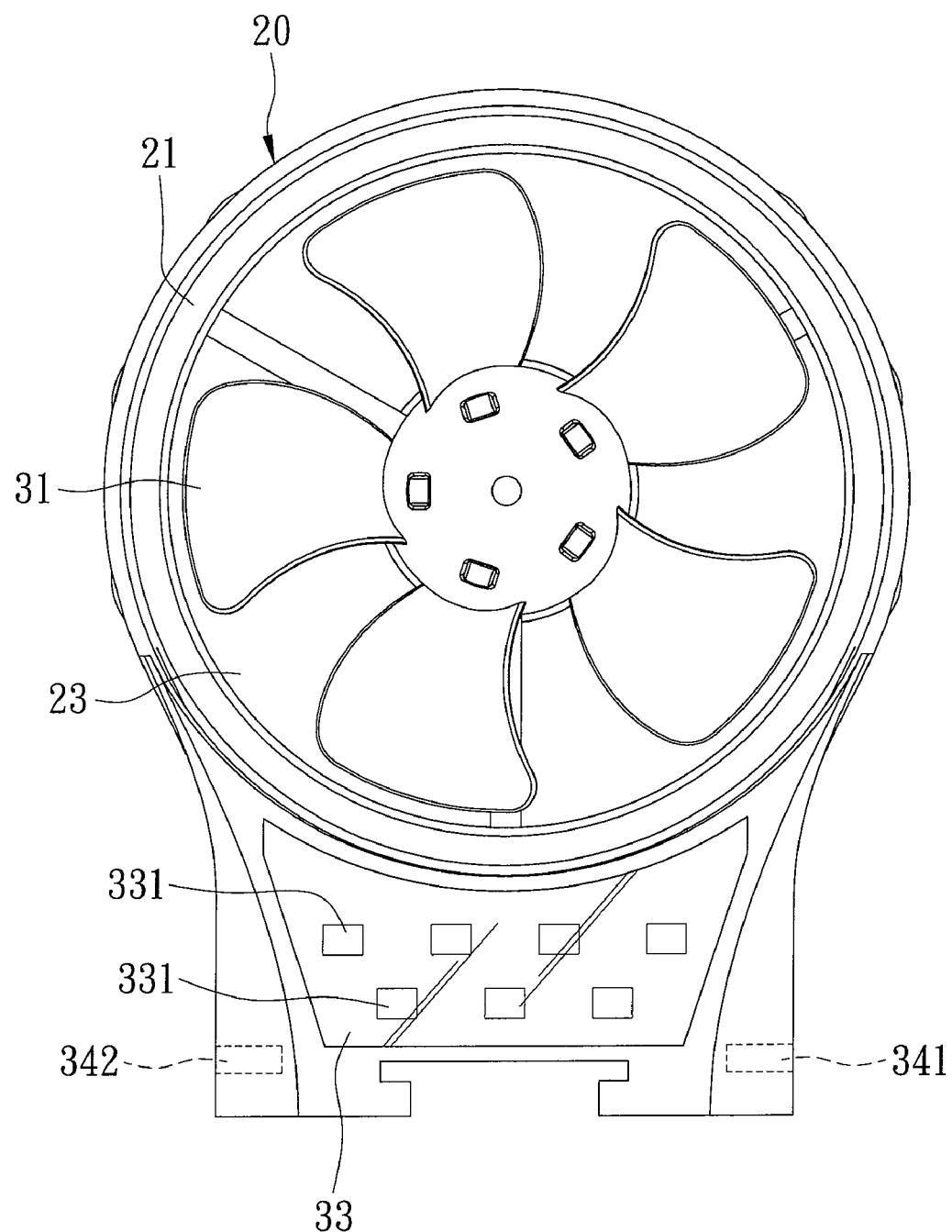
FIG. 2 is a front schematic view illustrating a lighting module, a power port module, and a charging port module of the preferred embodiment.
Figure 3:
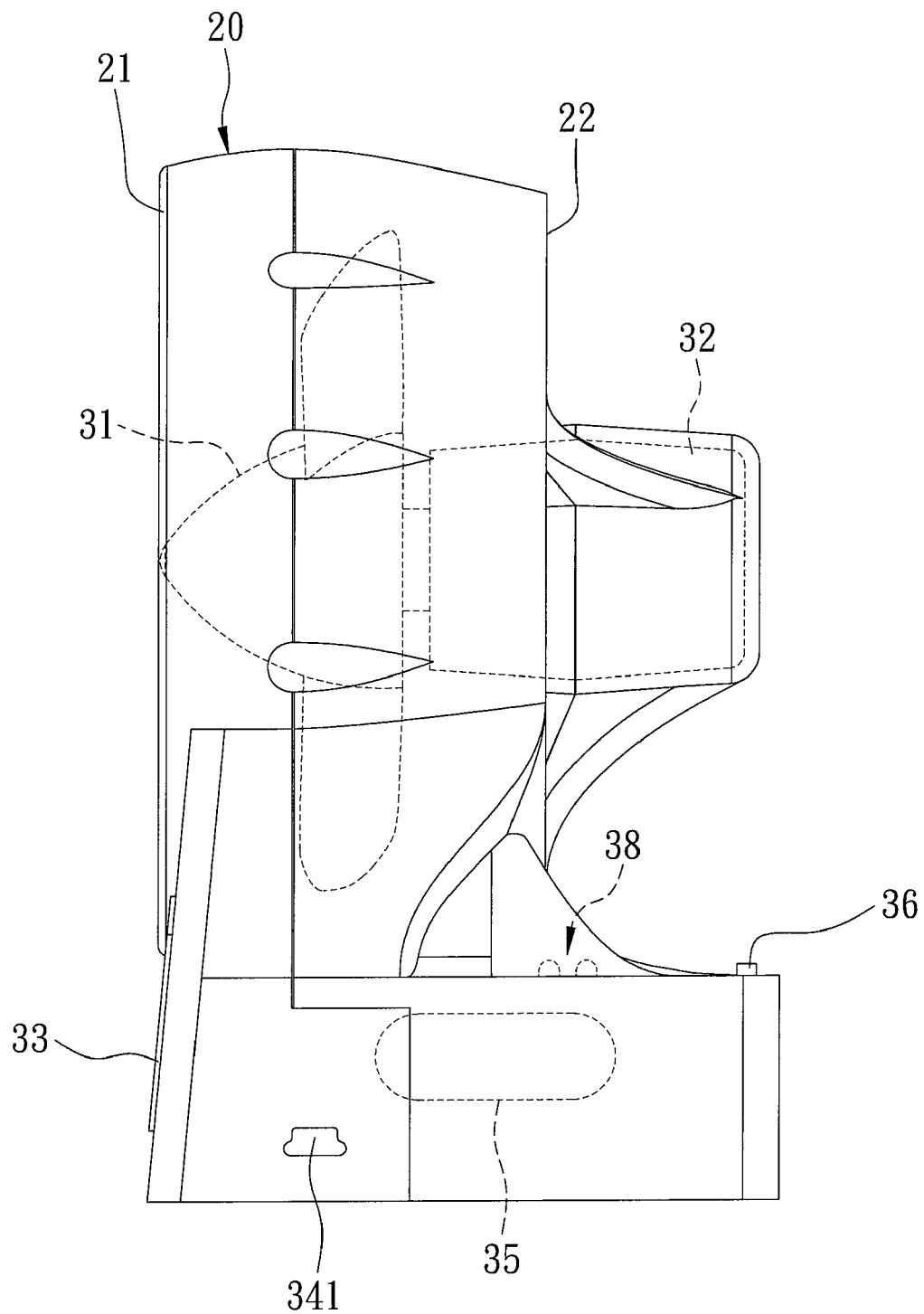
FIG. 3 is a side elevation schematic view illustrating a blade unit, an electric generator unit, and a battery seat of the preferred embodiment.
Figure 4:
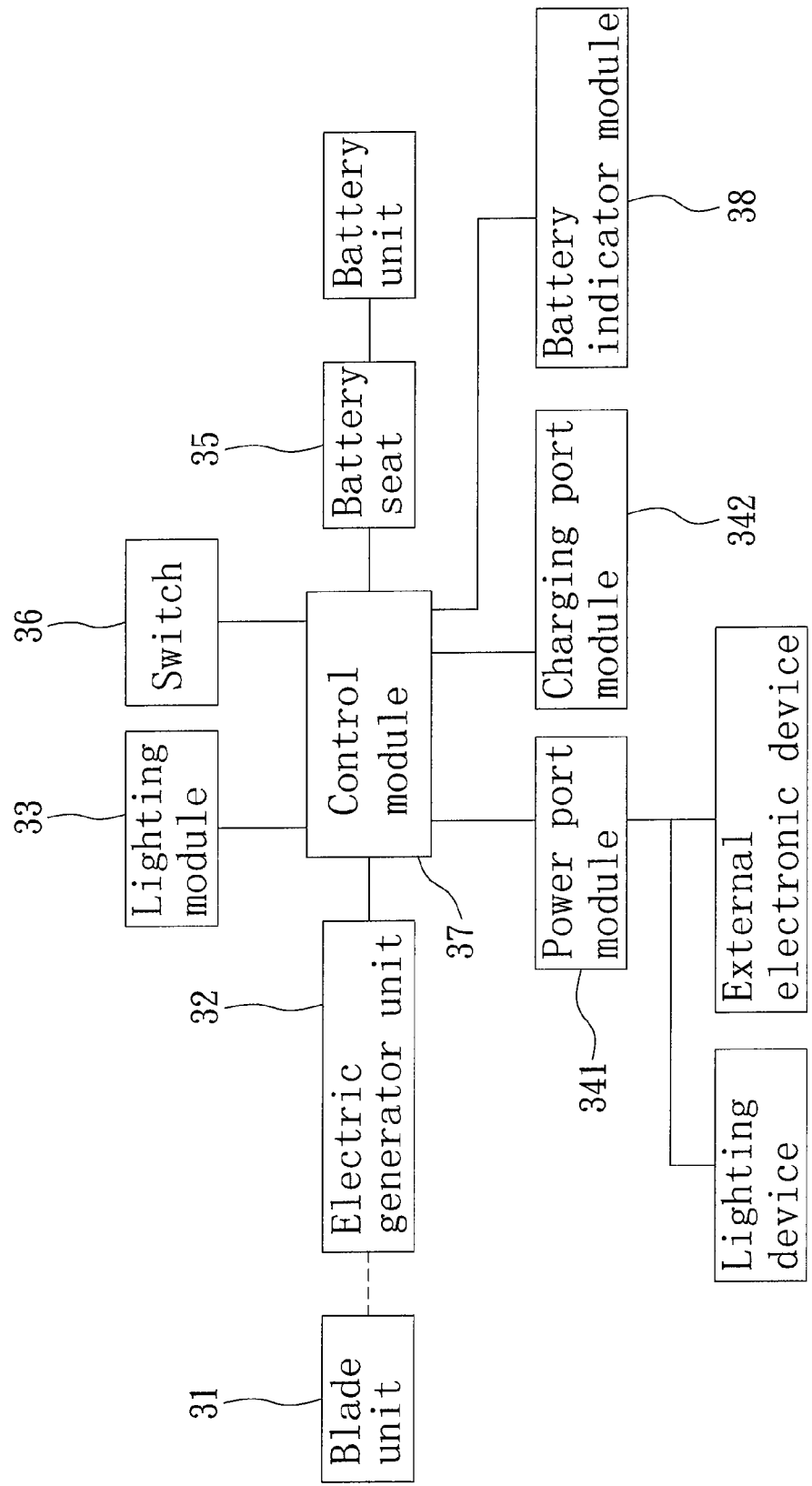
FIG. 4 is a block diagram illustrating a control module, and other components connected thereto of the preferred embodiment of the present invention.

Referring to FIG. 1 to FIG. 4, a preferred embodiment of a lighting device 200 of the present invention includes a casing unit 20, a lighting module 33, a wind generator, a power port module 341, a battery seat 35, and a control module 37. The casing unit 20 is removably mounted on a coupling seat 90 of a bicycle.

The casing unit 20 includes a first side 21, a second side 22 opposite to the first side 21, and a wind duct 23 that extends through the first side 21 and the second side 22.

The lighting module 33 is disposed at the first side 21 of the casing unit 20 and is operable to emit light outwardly of the casing unit 20 and away from the first side 21 of the casing unit 20. In this embodiment, the lighting module 33 includes a plurality of light-emitting diodes 331.

The wind generator includes a blade unit 31 disposed in the wind duct 23 and an electric generator unit 32 coupled to the blade unit 31. The blade unit 31 is driven to rotate by wind flow through the wind duct 23. The electric generator unit 32 is driven by rotation of the blade unit 31 to generate electricity.

The power port module 341 is mounted to the casing unit 20, is accessible from an exterior of the casing unit 20, and is adapted for connecting to an external electronic device, such as a mobile phone, a multi-media player or other lighting devices (for example, a tail warning lamp) of the bicycle. Preferably, the power port module 341 includes a universal serial bus (USB) port.

The battery seat 35 is mounted to the casing unit 20, is coupled electrically to the control module 37, and is adapted for connecting electrically to a battery unit.

The control module 37 is electrically coupled to the lighting module 33, the electric generator unit 32, the battery unit and the power port module 341, and is configured to control distribution of electricity generated by the electric generator unit 32 to the lighting module 33, the power port module 341, and the battery seat 35 for charging the battery unit that is connected to the battery seat 35.

Preferably, the control module 37 is further configured to control distribution of electricity stored by the battery unit, which is connected to the battery seat 35, to the lighting module 33 and the power port module 341.

Preferably, the lighting device 200 further includes a charging port module 342 mounted to the casing unit 20, coupled electrically to the control module 37, and adapted for connecting electrically to an external power source. The control module 37 is further configured to control distribution of electricity received by the charging port module 342 from the external power source to the battery seat 35 for charging the battery unit that is connected to the battery seat 35.

Preferably, the lighting device 200 further includes a switch 36 coupled to the control module 37 and operable between ON and OFF states. The control module 37 controls activation and deactivation of the lighting module 33 according to the ON and OFF states of the switch 36, respectively.

Preferably, the lighting device 200 further includes a battery indicator module 38 disposed on the casing unit 20, and coupled electrically to and controlled by the control module 37 to indicate at least one of battery discharged, battery charging, and battery fully charged conditions. In this embodiment, the battery indicator module 38 includes a battery charging indicator and a battery discharged indicator. When the battery unit is in the battery discharged condition, the battery discharged indicator emits a red light continuously. When the battery unit is in the battery charging condition, the battery charging indicator flashes a green light. When the battery unit is in the battery fully charged condition, the battery charging indicator emits a green light continuously.

Preferably, upon detection that the battery unit is discharged, the control module 37 is further configured to prioritize distribution of electricity generated by the electric generator unit 32 over the lighting module 33 over the battery seat 35, and if there is spare electricity after distribution of electricity to the lighting module 33, the control module 37 is further configured to control distribution of the spare electricity to the battery seat 35 for charging the battery unit that is connected to the battery seat 35.

Operation of the lighting device 200 with wind generator of the present invention is further illustrated hereinafter. When the switch 36 is operated to the ON state, the lighting module 33 is activated by the control module 37. The control module 37 is configured to control distribution of electricity generated by the electric generator unit 32 to the lighting module 33, the power port module 341, and the battery seat 35 once the blade unit 31 is driven to rotate by wind flow and the electric generator unit 32 is driven by rotation of the blade unit 31 to generate electricity. If electricity generated by the electric generator unit 32 is sufficient, the lighting module 33 does not need electricity stored by the battery unit, which is connected to the battery seat 35, and the battery unit is charged by the battery seat 35 which is distributed with electricity generated by the electric generator unit 32. In the meantime, the external electronic device may also be distributed with electricity generated by the electric generator unit 32 via the power port module 341.

On the other hand, if electricity generated by the electric generator unit 32 is insufficient for the lighting module 33, the control module 37 is configured to control distribution of electricity stored by the battery unit, which is connected to the battery seat 35, to the lighting module 33 for satisfying electricity requirement of the lighting module 33.

The control module 37 is configured not to distribute electricity that is generated by the electric generator unit 32 or that is stored by the battery unit to the lighting module 33, when the switch 36 is operated in the OFF state such that the control module 37 deactivates the lighting module 33 (for example, during daytime, when illumination and warning light is unnecessary). At this time, if the electric generator unit 32 is still in operation, the control module 37 is configured to control distribution of electricity generated by the electric generator unit 32 to the battery seat 35 for charging the battery unit that is connected to the battery seat 35.

In this way, electricity generated by the electric generator unit 32 may be provided to the external electronic device. Moreover, the battery unit may be charged via the charging port module 342 without requiring wind flow through the wind generator. Furthermore, the lighting module 33 may provide forwardly directed illumination.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lighting device comprising:
   a casing unit including a first side, a second side opposite to said first side, and a wind duct that extends through said first side and said second side;
   a lighting module disposed at said first side of said casing unit and operable to emit light outwardly of said casing unit and away from said first side of said casing unit;
   a wind generator including a blade unit disposed in said wind duct and an electric generator unit coupled to said blade unit, said blade unit being driven to rotate by wind flow through said wind duct, said electric generator unit being driven by rotation of said blade unit to generate electricity;
   a power port module mounted to said casing unit, accessible from an exterior of said casing unit and adapted for connecting to an external electronic device;
   a battery seat mounted to said casing unit, and adapted for connecting electrically to a battery unit; and
   a control module electrically coupled to said lighting module, said electric generator unit, said power port module and said battery unit, and configured to control distribution of electricity generated by said electric generator unit to said lighting module, said power port module, and said battery seat for charging said battery unit that is connected to said battery seat.

2. The lighting device as claimed in claim 1, wherein said lighting module includes a plurality of light-emitting diodes.

3. The lighting device as claimed in claim 1, wherein said power port module includes a universal serial bus (USB) port.

4. The lighting device as claimed in claim 1, wherein said control module is further configured to control distribution of electricity generated by said electric generator unit and electricity stored by said battery unit, that is connected to said battery seat, to said lighting module and said power port module.

5. The lighting device as claimed in claim 1, further comprising a charging port module mounted to said casing unit, coupled electrically to said control module, and adapted for connecting electrically to an external power source, wherein said control module is further configured to control distribution of electricity received by said charging port module from the external power source to said battery seat for charging said battery unit that is connected to said battery seat.

6. The lighting device as claimed in claim 1, further comprising a switch coupled to said control module and operable between ON and OFF states, said control module controlling activation and deactivation of said lighting module according to the ON and OFF states of said switch, respectively.

7. The lighting device as claimed in claim 1, further comprising a battery indicator module disposed on said casing unit, and coupled electrically to and controlled by said control module to indicate at least one of battery discharged, battery charging, and battery fully charged conditions.

8. The lighting device as claimed in claim 1, wherein upon detection that said battery unit is discharged, said control module is further configured to prioritize distribution of electricity generated by said electric generator unit to said lighting module over said battery seat, and if there is spare electricity after distribution of electricity to said lighting module, said control module is further configured to control distribution of the spare electricity to said battery seat for charging said battery unit that is connected to said battery seat.

* * * * *